Jan. 9, 1968
A. K. LYLE
3,362,808
GLASS-MELTING FURNACE
Filed Sept. 14, 1964
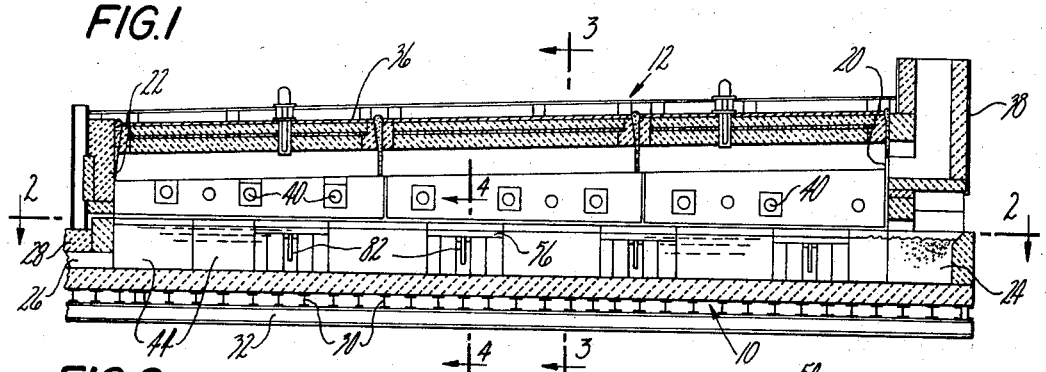
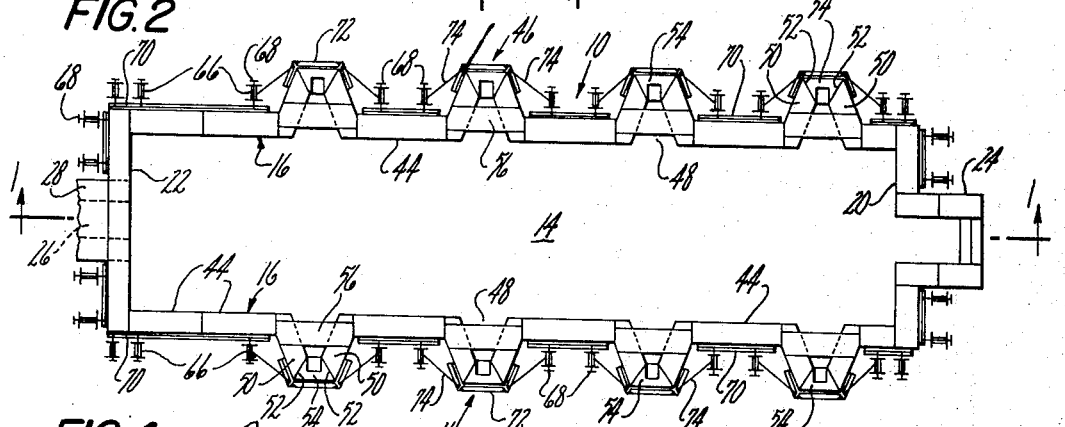
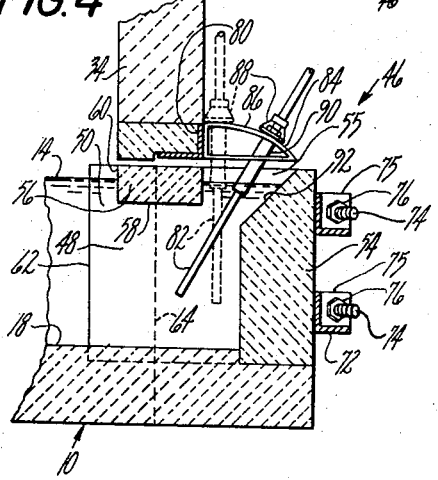
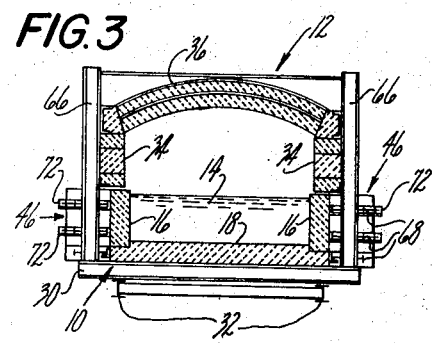
INVENTOR.
AARON K. LYLE
BY
McCormick, Paulding & Huber
ATTORNEYS

United States Patent Office 3,362,808
Patented Jan. 9, 1968

3,362,808
GLASS-MELTING FURNACE
Aaron K. Lyle, West Hartford, Conn., assignor to Emhart Corporation, Bloomfield, Conn., a corporation of Connecticut
Filed Sept. 14, 1964, Ser. No. 396,148
8 Claims. (Cl. 65—335)

This invention relates to glass-melting furnaces, and deals more particularly with such a furnace specially constructed to provide one or more openings communicating with the molten glass therein.

In the discussion which follows, the invention is described as applied to a glass furnace generally similar to that shown and described in my previous Patent No. 2,890,547 for "Apparatus for and Method of Making Glass." This furnace is of a continuous small capacity type wherein the glass is at least partially melted and fined by heat applied above a glass and batch containing tank, the heat being obtained from the combustion of gas or other fuels. The openings provided in accordance with the invention are further disclosed as receiving electrodes for passing electric currents through the glass to supplement or boost the combustion heating of the glass by Joule effect heat. It will be understood, however, that the novel features of furnace construction comprising this invention may be applied to a large number of furnace designs and types different from the design and type of furnace shown, and more particularly may be applied, if desired, to a furnace of the all-electric variety wherein little or no combustion heat is applied to the furnace after the tank is initially filled with molten glass. It will further be understood that the access openings provided by the invention are not necessarily limited to use with electrodes and may be conveniently utilized for the introduction of other implements, such as bubblers or stirrers, or for the addition of coloring agents or other materials to the molten glass.

In the past, electrodes or other implements inserted into the body of molten glass contained in a furnace have generally been passed through holes formed in the side walls or bottom of the tank portion of the furnace. This has various disadvantages including the weakening of the refractory blocks as a result of the holes formed therein, the danger of glass leakage through the openings, and the necessity for plugging the openings when the implements are removed. Also, the holes are designed for one particular size and shape of implement and often cannot be used with other implements. Sometimes electrodes or other implements are inserted vertically into the molten glass from a position above the surface of the glass and batch. This, however, is usually only practical in an all-electric furnace, as in a combustion heated furnace the space above the glass and batch is filled with hot gases and flames, usually forming an oxidizing atmosphere, which would destroy the implement or its connections unless protective measures are employed.

The general object of the invention is, therefore, to provide a glass-melting furnace construction including one or more openings providing convenient access to the molten glass.

A further object of the invention is to provide a glass-melting furnace capable of accepting a wide variety of implements for insertion into the molten glass and permitting adjustments of the implement relative to the furnace walls.

A still further object of this invention is to provide a bay construction for a sidewall of the tank portion of a glass-melting furnace which bay construction provides access to the body of molten glass in the tank. In keeping with this object of the invention, it is a further object to provide a bay construction through which a force directed longitudinally of the side wall may be exerted without collapsing the bay so as to permit the sidewall to be tightened by jack-bolts or other corner binding devices employed at the corners of the tank.

Another object of the invention is to provide a bay construction of the foregoing character which may be incorporated into new glass melting furnaces and which may also be incorporated into existing furnaces with little modification of the latter.

A still further object of this invention is to provide a glass melting furnace construction having means permitting the insertion of an electrode or other device into the molten glass, such means being of a type wherein only a small surface area of glass is exposed to the atmosphere outside of the furnace so as to prevent the loss of heat by radiation, wherein the glass adjacent the outside atmosphere is maintained in a relatively cool and stiff condition to reduce the oxidation and erosion of the inserted device at the surface of the glass and to reduce or eliminate the cooling requirements at this point, and wherein convection currents in the glass are minimized in the vicinity of the inserted device to reduce erosion of the device by such currents.

Other objects and advantages of the invention will be apparent from the following description and from the drawings forming a part hereof.

The drawing shows a preferred embodiment of the invention and such embodiment will be described, but it will be understood that various changes may be made from the construction disclosed and that the drawing and description are not to be construed as defining or limiting the scope of the invention, the claims forming a part of this specification being relied upon for that purpose.

Of the drawing:
FIG. 1 is a longitudinal vertical sectional view of a glass melting furnace embodying the present invention, this view being taken on the line 1—1 of FIG. 2;
FIG. 2 is a horizontal sectional view of the furnace of FIG. 1; this view being taken on the line 2—2 of FIG. 1 and showing the bays with the electrodes removed therefrom;
FIG. 3 is a transverse vertical sectional view taken on the line 3—3 of FIG. 1; and
FIG. 4 is an enlarged fragmentary vertical sectional view taken on the line 4—4 of FIG. 1.

Turning now to the drawing, the illustrated glass-melting furnace is relatively long and narrow and is comprised basically of a lower part or tank 10 and an upper part or roof structure 12, the two parts cooperating to form a long and narrow enclosed furnace channel. The tank 10 during operation of the furnace contains a body of molten glass and batch, indicated at 14. The roof structure 12 serves several purposes including that of reducing the loss of heat from the furnace and that of providing a combustion chamber and flue for the combustion heating process applied above the surface of the glass.

As best shown in FIGS. 2 and 3, the tank 10 includes two spaced sidewalls 16, 16, a floor or hearth 18, a rear end wall 20 and a front end wall 22. Included in the rear wall 20 is a doghouse 24 through which batch is introduced into the main body of the tank, the doghouse being located intermediate the sidewalls 16, 16. At the front end of the furnace is a throat or passageway 26 which is normally submerged below the surface of the glass in the tank and which communicates with a forehearth 28 or other duct for conveying molten glass from the tank to a glass using unit or other point of use.

The tank 10 is or may be supported in a conventional manner by a plurality of beams 30, 30 extending transversely of the tank and resting on other beams 32, 32 extending longitudinally of the tank. The longitudinal beams may in turn be supported some distance above the floor by a suitable supporting structure.

The roof structure 12, as best shown in FIG. 3, includes two generally vertical sidewalls 34, 34, each of which extends longitudinally along and vertically upwardly from a respective one of the tank sidewalls 16, and an arched crown 36 which extends between the upper ends of the sidewalls 34, 34 to enclose the space therebetween. The sidewalls 34, 34 are each substantially straight for the full length of the furnace and each is preferably laterally outwardly offset relative to the associated tank side wall 16 so that the plane of the inner surface of the roof side wall 34 is located intermediate the planes of the inner and outer surfaces of the tank side wall 16.

At the rear end of the furnace, the roof structure 36 communicates with a stack 38 through which spent gases are exhausted from the furnace. These spent gases tend to rise to the top of the furnace chamber and flow rearwardly of the furnace toward the stack 38. Since the combustion process is carried out at various points along the length of the furnace, the volume of the spent gases in any incremental length of the furnace increases in going toward the rear of the furnace, and therefore the roof structure is preferably inclined as shown in FIG. 1 to provide a greater space for such gases at the rear of the furnace than at its forward end. The side walls of the roof structure are constructed of refractory blocks and each includes a plurality of burner blocks for accommodating burners 40, 40 for introducing a mixture of air and fuel into the furnace chamber for combustion above the surface of the glass and the tank. The burners 40, 40 are arranged along the length of the furnace and are spaced at substantially equal distances from one another. As between the two side walls of the roof, the burners 40, 40 are preferably arranged as shown in my previously issued Patent No. 2,890,547 so that each burner is located directly opposite from a corresponding burner of the opposite sidewall. This causes the flames from two opposing burners to counteract one another and thereby prevents the flames of either burner from injuring the refractory of the opposite sidewall by being concentrated on a small area of such sidewall.

Returning now to the construction of the tank 10, each sidewall 16 is comprised of a number of refractory blocks or sections 44, 44 which rest on other refractory blocks making up the floor or hearth 18 of the tank. The blocks 44, 44 of each sidewall are arranged in a substantially straight line and at various points along the length of the tank are spaced from one another to provide longitudinal gaps in the sidewall which receive laterally outwardly extending bays 46, 46. The walls of the bays 46, 46 are continuous with the remainder of the associated sidewall 16 and provide laterally outwardly extending recesses 48, 48 which communicate with the main body of the tank and which serve to bring small quantities of the molten glass of the tank outwardly beyond the tank and roof structure sidewalls.

The bays may be constructed in various different ways and in the illustrated case, each bay consists of two side blocks 50, 50 extending laterally outwardly from the plane of the sidewall 16 and at their outer ends having inclined surfaces 52, 52 which are engaged by a keystone block 54. The side blocks 50, 50 of each bay may be arranged perpendicular to the sidewall blocks 44, 44, but preferably and as shown, they are inclined toward each other to provide the recess 48 defined thereby with a V shape in horizontal section, as in FIG. 2. Also, each side block 50 preferably passes laterally inwardly beyond the outer surface of the adjacent tank sidewall block 44 and has an inner end surface located generally in the same plane as the inner surface of said adjacent sidewall block. The bay forming blocks 50, 50 and 54 rest on the hearth 18 which is extended outwardly beyond the sidewalls 16, 16 at the locations of the bays to accommodate the latter. The hearth is also preferably recessed, as shown in FIG. 4, to receive the lower ends of the blocks. These blocks extend vertically up from the hearth 18 to a point adjacent the lower end of the associated roof sidewall, and therefore the recess 48 provided by each bay extends vertically for the full depth of the glass in the tank. Each bay has a normally open top or mouth 55 wherein a small portion of the surface of the molten glass is exposed exteriorly of the tank. The upper end surfaces of the bay forming blocks are, however, flat and in the same plane so that in the event a bay is not used, a flat refractory block may be placed thereon, if desired, to close the mouth of the bay.

Preferably, the surface of the glass which is exposed to the exterior of the furnace in the mouth of each bay is separated from the surface of the glass exposed to the interior of the furnace. This is accomplished by a refractory block or bridge member 56 which extends across the top portion of the bay generally parallel to the tank and roof structure sidewalls. As shown best in FIG. 4, the illustrated bridge member 56 is laterally aligned with the roof structure sidewall 34 and extends from a point close to the lower end of the roof sidewall to a point located below the normal level of the glass in the tank. The bridge member 56 is therefore normally partially submerged in the molten glass; however, the distance by which it projects into the molten glass is relatively small in comparison to the depth of the glass so that the lower surface of the bridge member 56 is spaced from the bottom of the tank by a relatively large distance preferably greater than one half the normal depth of the glass. As will be evident from FIGS. 2 and 4, each bridge member 56 at each of its ends is received in a recess in the adjoining bay block 50 and has an end surface which engages the adjacent sidewall block 44. The recess in one of the blocks 50 is shown at 58 in FIG. 3 and has a cross-sectional shape conforming to the cross-sectional shape of the block 56. The inner edge 60 of this recess is located intermediate the inner surface 62 and outer surface 64 of the adjacent sidewall blocks 14, 14.

In addition to the structure described above, the furnace also includes a means for laterally supporting the sidewall blocks of the tank against the outward pressure of the molten glass and for vertically supporting the roof structure 12 above the tank so that the weight of the roof structure is not carried by the refractory blocks of the tank. As shown in the drawing, this means includes a number of vertical posts 66, 66 located at various positions along the outside of the furnace. Referring to FIG. 3, at its lower end portion, each post 66 carries three jack-bolts 68, 68. One of these jack-bolts serves to apply pressure against the refractory blocks making up the hearth 18 and the other two jack-bolts serve to apply a pressure against the adjacent sidewall block 44. Instead of bearing directly against the adjacent block, each jack-bolt preferably, as shown best in FIG. 2, bears against the pressure plate 70 which extends some distance longitudinally of the furnace and which is located between the blocks of the tank and the inner ends of the jack-bolts. When the tank is empty of glass, the jack-bolts normally apply little or no pressure against the sidewall blocks of the tank, and they normally serve a supporting function only when the tank is filled with glass. Customarily, after the furnace has become filled with glass and brought up to operating temperature, the jack-bolts are adjusted to bring the individual sidewall blocks into proper alignment with one another. An exception to this involves the jack-bolts located at the corners of the furnace which may be adjusted prior to heat up of the furnace to exert compressive forces between the ends of the various walls of the tank to cause the blocks making up the wall to be forced together end to end. For example, with respect to either of the sidewalls 16, 16, the jack-bolts located at the opposite ends of the furnace and in alignment with the sidewall may be adjusted to exert a compressive force running the length of the sidewall. With regard to this practice, it should be noted that the bridge members 56, 56 of the various bays 46, 46 in the sidewall serve to transmit this compressive force between the sidewall blocks 44, 44 located on opposite sides of each bay and therefore prevent the bay forming blocks from being collapsed or moved out of place by this adjustment of the corner jack-bolts.

The bay forming blocks are also themselves supported against the outward pressure of the molten glass in the tank. In the illustrated example, the means for providing this support comprises two vertically spaced restraining members 72, 72 associated with each bay. As shown best in FIG. 2, each restraining member 72 is generally U-shaped in appearance so as to conform to the shape of the outer portion of the bay, against the outer surface of which it bears. Each restraining member 72 is further tied to the two adjacent posts 66, 66 by two tie rods 74, 74. At its outer end, each tie rod 74 passes through an apertured plate 75 welded to the restraining member and threadably receives a nut 76, and a similar connection is or may be provided between the inner end of the tie rod and the associated post, to permit adjustment of the restraining member 72 toward and away from the sidewall blocks 44, 44 as a result of adjusting the nuts on the associated tie rods. Therefore, the bay forming blocks may be adjusted after heat up in substantially the same manner as are the sidewall forming blocks 44, 44 by adjustment of the jack-bolts.

The vertical support for the roof structure 12 includes the posts 66, 66. Attached to the posts stationed adjacent each roof sidewall is a supporting steel angle beam 80 which extends longitudinally along the bottom edge of the adjacent roof sidewall for substantially the full length thereof. As shown best in FIG. 4, each angle beam 80 includes a generally horizontal leg which vertically supports the associated wall 34 and a vertical leg which is located along the outer surface of the wall. Each beam 80 is so positioned that the associated wall 34 is supported with its lower end spaced a very small distance above the upper end of the associated tank sidewall 16. From FIG. 3, it will also be noted that the posts 66, 66 also engage the outer surfaces of the roof sidewalls to laterally support the refractory blocks making up said walls.

Returning to the bays 46, 46, it will now be understood that these bays provide a convenient arrangement for inserting electrodes, or other implements such as bubblers or stirrers, into the molten glass at various points along the length of the furnace. They are particularly advantageous for use with electrodes, and FIGS. 1 and 4 show electrodes 82, 82 in place in the illustrated bays. Regardless of the type of implement inserted into a bay, the presence of the roof support beam 80 makes convenient its use as part of the support for the implement. For example, FIG. 4 shows a bracket 84 which is fixed to the vertical leg of the beam 80 and which extends outwardly over the mouth of the associated bay. This bracket may take various different forms depending on the type of implement used but in the illustrated case, it is shown to include an arcuate portion 86 to which an electrode holder 88 is mounted by means permitting the electrode holder to be moved to various different positions therealong to change the angle of the electrode 82 relative to the tank and roof sidewalls. In FIG. 4, the solid lines show the electrode and electrode holder in one position of adjustment and the broken lines show the same parts in a different position of adjustment. The electrode holder 88 is also preferably so constructed as to permit the electrode 82 to be vertically adjusted to vary its depth of penetration into the body of molten glass. Additionally, the electrode holder may include a refractory shield 90 which surrounds the electrode at its point of entry into the molten glass to prevent its oxidation and erosion at this point. If desired, the electrode holder may also include both a refractory protective shield covering the surface of the electrode where it enters the glass and a water or air cooled jacket located above the surface of the glass adjacent the connection of the electrode holder with the supporting bracket, the refractory coating extending from the cooling jacket into the molten glass. In order to permit the degree of angular adjustment shown in FIG. 4, the keystone block 54 of the bay is preferably provided at its upper end with a downwardly and inwardly inclined surface 92.

The bays provide openings communicating with the body of molten glass which are considerably larger than needed to accommodate most implements and therefore implements of various different cross-sectional shapes may be readily inserted into the bays without modification of the latter. Also, the arrangement is such as to permit both angular and vertical adjustment of the implement as will be evident from FIG. 4. By virtue of the presence of the bridge member 56, the surface of the glass in the mouth of each bay is separated from the surface of the glass in the interior of the furnace and the possibility of floating pieces of batch entering the mouth of a bay is prevented. Further, because of being somewhat isolated by the bridge member from the remaining portion of the glass in the tank, the glass in the upper portion of the mouth of a bay is maintained at a relatively cooler temperature than that of the main body of glass, and therefore, the cooling and other protective measures required for protecting the electrode or other implement at its point of entrance into the molten glass are reduced if not entirely eliminated. The illustrated bay construction also has the advantage that the electrodes or other implements are located in the bay recesses 48, 48 where the convection currents of the glass are quite small, the bridge members 56, 56 aiding in the reduction of such convection currents. Since convection currents tend to erode electrodes or implements inserted into the glass, the reduction of convection currents in the vicinity of the implement increases the life of the latter. The implements are also readily placed into and removed from the bays and no block of the tank is weakened by an opening formed therethrough.

The invention claimed is:

1. In a glass-melting furnace, the combination comprising a tank having a sidewall including a number of first refractory blocks arranged in a substantially straight line with two of said blocks being longitudinally spaced from each other to define a longitudinally extending gap, and a bay at said gap projecting laterally outwardly from said sidewall and including two spaced side refractory blocks extending laterally outwardly from the line of said first blocks and having outer end surfaces inclined in opposite directions and inwardly toward the interior of said bay, a keystone block placed at the outer ends of said two spaced side blocks and having two inclined surfaces engageable respectively with said inclined surfaces of said two spaced side blocks, and a bridge member extending across the top portions of said two spaced side blocks generally parallel to said side wall and also extending both above and below the normal level of the glass in said tank so as to be normally partially submerged in said glass to separate the surface of the glass in said bay from the surface of the glass in the main body of said tank.

2. The combination defined in claim 1 further characterized by means for restraining said keystone block against movement outwardly relative to said sidewall and for restraining said two spaced side blocks against spreading movement relative to one another at their outer ends.

3. The combination defined in claim 2 further characterized by said two spaced side blocks being arranged so that they converge toward one another in going from their inner to their outer ends and having outer vertical side surfaces inclined relative to said sidewall, and said means for restraining said keystone block and said two spaced side blocks comprising a horizontally oriented generally U-shaped restraining member having a base adapted to engage said keystone block and two mutually inclined arms adapted to respectively engage said two outer side surfaces of said two side blocks, and means for restraining said restraining member against movement outwardly relative to said sidewall.

4. The combination defined in claim 3 further characterized by said means for restraining said restraining member comprising two stationary vertical posts located on opposite sides of said bay laterally inwardly of the outer extent of said keystone block and two tie rods each extending from a respective one of said posts to said restraining member, each of said tie rods being connected at one end to its associated post and at its other end to said restraining member and at least one of said ends having a threaded connection with the associated part permitting adjustment of said restraining member laterally of said sidewall.

5. The combination defined in claim 1 further characterized by said sidewall having its upper end surface located in a horizontal plane spaced above the normal level of the glass contained in said tank, said two side blocks and said keystone block of said bay also having upper end surfaces located in said horizontal plane and said keystone block including a downwardly and inwardly inclined surface extending from its upper end surface to a point below the normal level of the glass in said tank, said keystone block further having a vertical inwardly directed surface extending between said two sidewall blocks and which is intersected at its upper edge by said inclined surface, said inclined surface having substantially the same lateral width as said vertical surface so as to form essentially a continuation thereof.

6. The combination defined in claim 1 further characterized by each of said two spaced side blocks extending inwardly beyond the outer surface of said line of first blocks and having an inner end surface located substantially in the plane of the inner surface of said first line of blocks so that when said bay is filled with molten glass the pressure of the glass on said side blocks tends to urge said inner ends of said side blocks into engagement with the adjacent blocks in said line of first blocks, and restraining means at the laterally outer end of said bay extending across said keystone block and engaging said sidewall blocks for restraining said keystone block against lateral outward movement and for restraining the outer ends of said sidewall blocks against spreading movement.

7. The combination defined in claim 5 further characterized by each of said two spaced blocks having a recess in the upper surface thereof for receiving the corresponding end portion of said bridge member and conforming generally to the cross-sectional shape of said bridge member so that the upper surface of said bridge member is located in said horizontal plane.

8. The combination defined in claim 1 further characterized by a roof structure located above said tank and enclosing the top thereof, said roof structure having a sidewall extending upwardly from said sidewall of said tank and said bay projecting outwardly beyond said roof structure sidewall, a metallic supporting member for said roof extending longitudinally along the bottom of said roof structure sidewall, a bracket fixed to said supporting member at the location of said bay, and a device supported by said bracket and extending therefrom into the body of glass contained within said bay.

References Cited
UNITED STATES PATENTS

| | | | |
|---|---|---|---|
| 938,518 | 11/1909 | Schram | 65—339 |
| 1,638,737 | 8/1927 | Kutchka | 65—345 |
| 2,397,852 | 4/1946 | Gentil | 65—335 X |
| 2,749,666 | 6/1956 | Baque | 65—134 X |

DONALL H. SYLVESTER, *Primary Examiner.*

F. W. MIGA, *Assistant Examiner.*